July 6, 1954 L. A. WILLIAMS 2,682,745
ORNAMENTAL CHAIN WITH CLOSED EDGE
Filed Jan. 31, 1947 3 Sheets-Sheet 3
FIG. 31
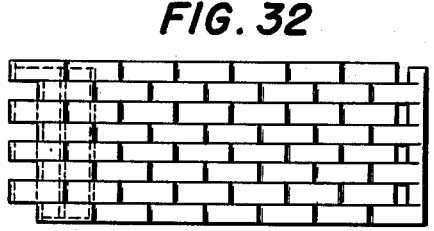
FIG. 32
FIG. 33
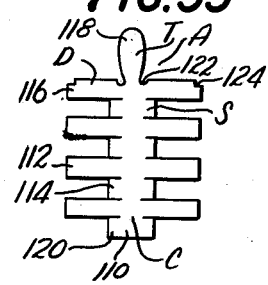
FIG. 34 FIG. 36
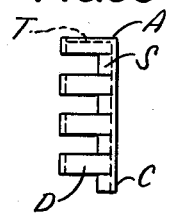
FIG. 35 FIG. 37
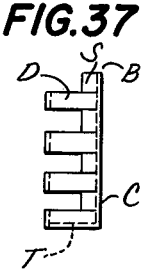
FIG. 38
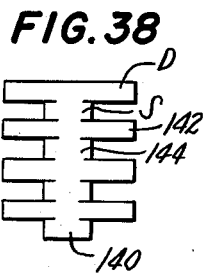
FIG. 39 FIG. 40
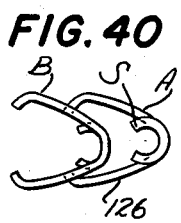
FIG. 41
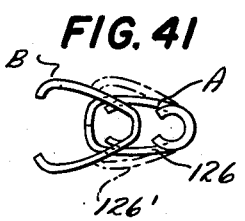
FIG. 43
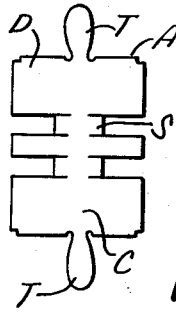
FIG. 44
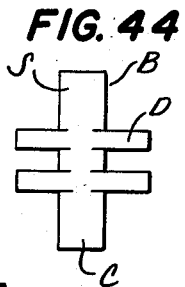
FIG. 42
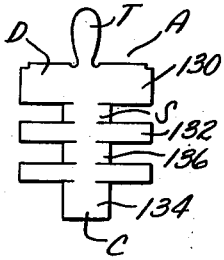
FIG. 45
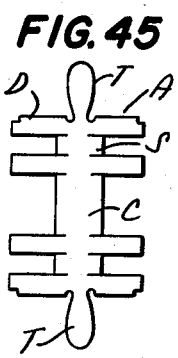
FIG. 46
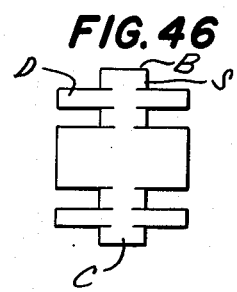
INVENTOR
LEON ALBERT WILLIAMS
BY
James and Franklin
ATTORNEYS

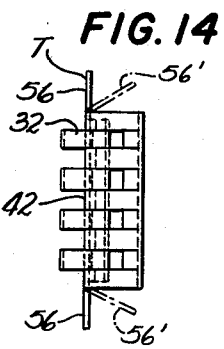

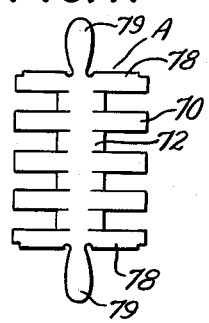
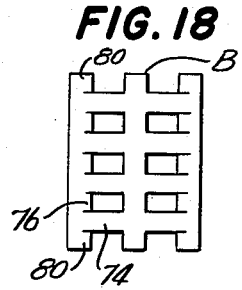
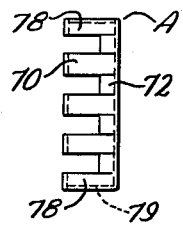
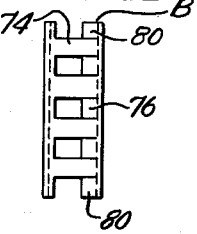
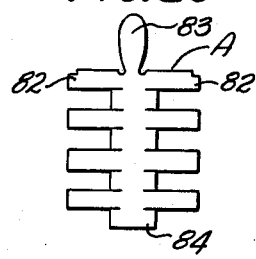
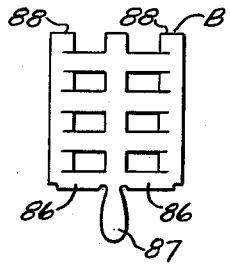
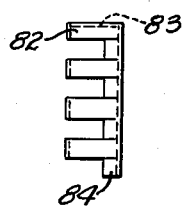
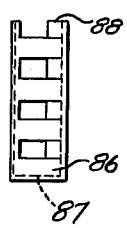
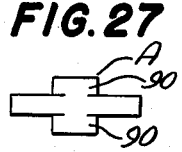
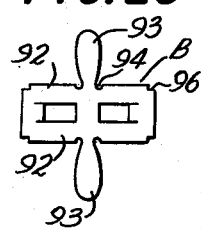
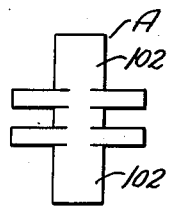
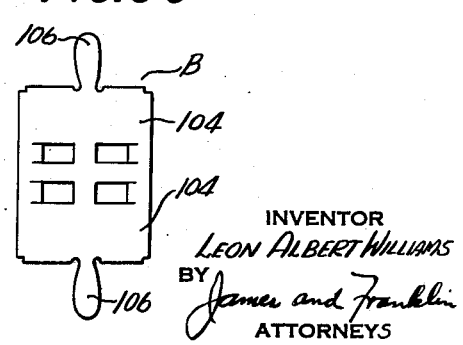

Patented July 6, 1954

2,682,745

UNITED STATES PATENT OFFICE 2,682,745

ORNAMENTAL CHAIN WITH CLOSED EDGE

Leon A. Williams, Waterbury, Conn., assignor to Benrus Watch Company, Inc., New York, N. Y., a corporation of New York Application January 31, 1947, Serial No. 725,566

8 Claims. (Cl. 59—80)

This invention relates to ornamental chains, especially of the basket weave type, and more particularly to such a chain having closed edges.

A true basket weave chain is made up of a plurality of rows of small links, alternate rows having the links displaced relative to the intermediate rows, so that the chain when viewed from above has a formation somewhat resembling a basket weave. Such chains have been revived in popularity in a somewhat simplified and less expensive form, in which the links are made of sheet metal blanks which extend entirely across the width of the chain, said blanks including arms which in the finished chain simulate small links, but which in fact form parts of the larger link. Moreover, in modern form the cost of such chains has been further reduced by eliminating the need for pivot pins extending across the chain, and instead the parts of the blanks interlock in such fashion as to connect and pivot the links on one another.

In accordance with the current vogue, a close-mesh or basket weave is preferred, and it has been found that appropriate spacers may be formed on the blanks for increasing the overlap of one blank relative to another, so that the simulated small links or sub-links fill the surface of the chain. This gives the chain a solid and expensive appearance, and makes it far more difficult for the observer to detect the absence of pivot pins for hinging the parts of the chain together.

The primary object of the present invention is to generally improve basket weave chains. A more particular object is to provide a basket weave chain having closed edges.

To accomplish the foregoing general objects, and other more specific objects which will hereinafter appear, my invention resides in the basket weave chain elements and their relation one to another, as are hereinafter more particularly described in the following specification. The specification is accompanied by drawings, in which:

Fig. 1 is an elevation showing one edge of a basket weave chain embodying features of my invention;

Fig. 2 is a plan view thereof;

Fig. 3 shows a male blank from which a male link may be formed;

Fig. 4 shows a female blank having end tabs, from which a female link with closed ends may be formed;

Fig. 5 is an end view of a male link after the blank has been folded to close the link;

Fig. 6 is a plan view of the same;

Fig. 7 is an end view of a female link after the blank has been folded to close the link and its ends;

Fig. 8 is a plan view of the same;

Fig. 9 is a section taken approximately in the plane of the line 9—9 of Fig. 8;

Fig. 10 is an end view of the female link in open condition;

Fig. 11 is an end view of the male link in open condition;

Fig. 12 is an end view showing the male link assembled with the female link;

Fig. 13 is a similar view showing the female link closed to complete the assembly of one male and female link;

Fig. 14 is a plan view of the assembly, and shows how the end tabs may be bent to close the ends of the assembly;

Figs. 15 and 16 show how such assemblies may be added in series to build up the chain;

Figs. 17 and 18 show modified mating male and female blanks, respectively;

Fig. 19 is an end view of the male link of Fig. 17, after it has been folded to close the link;

Fig. 20 is a plan view of the same;

Fig. 21 is an end view of the female link of Fig. 18, after it has been folded;

Fig. 22 is a plan view of the same;

Figs. 23 and 24 show modified mating male and female blanks, respectively;

Fig. 25 is a plan view of the blank of Fig. 23, after it has been folded to close the link;

Fig. 26 is a plan view of the female blank of Fig. 24, after it has been folded to close the link;

Figs. 27 and 28 show modified mating male and female blanks for a narrow basket weave chain having only three rows of sub-links;

Figs. 29 and 30 show modified mating male and female blanks for a basket weave chain having edge rows of sub-links which are wider than the center rows of sublinks;

Fig. 31 is an elevation showing one closed edge of a modified chain built up of male elements;

Fig. 32 is a plan view thereof;

Fig. 33 shows a male blank from which the chain of Fig. 31 may be formed;

Fig. 34 is an end view of the closed end of a link, after the blank has been folded to close the link;

Fig. 35 is a plan view of the same;

Fig. 36 is an end view of a link in inverted position;

Fig. 37 is a plan view of the same;

Fig. 38 shows a blank similar to that of Fig. 33, but without an end tab for closing the edge of the chain;

Fig. 39 is an end view of the link of Fig. 37 in open condition;

Fig. 40 is an end view showing how the links of Figs. 35 and 37 are assembled;

Fig. 41 is a similar view with one of the links closed.

Fig. 42 shows a blank for a modified chain, in which the edge rows of sub-links are wider than the others;

Figs. 43 and 44 show modified mating male links for a chain, in which both end arms and tabs are on alternate links, and in which the center row of sub-links is wider than the others.

Figs. 45 and 46 show a mating pair of male links for a chain, in which both end arms and tabs on alternate links, and in which the center row of sub-links is wider than the others.

Referring to the drawing, and more particularly to Fig. 2, the basket weave chain extends horizontally, and only a small section of the chain is shown. It is simulatedly made up of rows of small links 12, 14, 16, 18 and 20, with alternate rows of small links 22, 24, 26 and 28, the alternate rows being displaced sidewardly to create the simulated basket weave formation. However, the links 12, 14, 16, etc., are really sub-links formed by arms on a single blank which is folded into a generally tubular link, and similarly the links 22, 24, 26, etc., are really sub-links formed by arms on a blank which is folded to tubular formation. The large links extend all the way across the full width of the chain.

Referring now to all figures of the drawing, the invention comprises generically a chain made up of first and second links A and B in alternation. Each link has a cross-bar C, with arms D projecting transversely therefrom. The arms of a first link fit between the arms of a second link, in order to provide the desired basket weave appearance. There is an end tab T at that end of a link having arms D at the end, said tabs being so shaped that when folded over in the direction of the arms they serve to close the space within the arms, thus giving the chain closed edges. The links further include spacers S between the arms. The arms of each first link A fit around the spacers of a second link B, and the arms of each second link B fit around the spacers of a first link A, in order to provide a relatively close basket weave appearance.

In those forms of the invention shown in Figs. 1 through 30, each first link is a male link having a center bar and arms with free ends, and each second link is a female link having collateral center and edge bars with arms connecting said bars. However, in the forms of the invention shown in Figs. 31 through 46, the first and second links are each male links, that is, they each have a center bar with arms having free ends, and the spacers S are located on the center bar.

The broad idea of building up a basket weave chain of alternate male and female links is disclosed and claimed in my co-pending application, Serial No. 725,565 filed on even date herewith, since issued on November 7, 1950 as Patent No. 2,528,567 and is not broadly claimed herein. However, the application of end tabs for forming closed edges on the chain is not shown in the co-pending application, and is disclosed and claimed in the present application.

Figs. 3 and 4 respectively show sheet metal blanks from which male and female links may be formed. Referring to Fig. 3, the male link has a center cross-bar 30, with arms 32 and 34 projecting transversely therefrom. There are also spacers 36 and 38 on the cross-bar 30 between the arms 32 and 34. This blank is folded at the cross-bar 30 and at the ends of the arms to form a somewhat flattened tubular link best shown in Figs. 5 and 6. This link has a bar 30 at one side, arms 32 projecting from the top of bar 30, and arms 34 projecting from the bottom of the bar 30, the ends or tips of the arms being bent inwardly as indicated at 40, so that they come into abutting relation. The spacers 36 and 38 are also bent in the same general direction as the arms.

The female link shown in Fig. 4 has a center bar 42, and collaterally arranged edge bars 44 and 46. There are arms 48 and 50 extending between and connecting the bar 42 with the edge bars 44 and 46. There are also spacers 52 on edge bar 44 between the arms 48, and spacers 54 on edge bar 46 between the arms 50.

This blank is also folded to flattened tubular configuration as shown in Figs. 7, 8 and 9. It then comprises a center bar 42 on one side of the link, and edge bars 46 and 44 on the other side of the link, with arms 50 extending from the top of the center bar 42 to the upper edge bar 46, and arms 48 (not visible in Fig. 8) extending from the bottom of the center bar 42 to the lower edge bar 44. The spacers 52 and 54 are located within the edge bars and between the arms, as is clearly shown in the drawing.

The female blank of Fig. 4 further comprises end tabs 56. These are somewhat elliptical in shape, and are connected at one end to the body of the blank, there being a slight recess or incised neck at 58 which, as will appear later, results in the tab being received within the end arms, the indentation at 58 being large enough to compensate for the thickness of the sheet metal.

In building up the chain, pairs of links are preliminarily assembled, as shown in Fig. 13. These assemblies are then put together to build up the complete chain. The manner in which a single pair of links is preliminarily assembled may be described with reference to Figs. 10 through 14 of the drawing. The blank of the female link is first bent to the relatively widely open section shown in Fig. 10. The male blank is preliminarily bent to the less open section shown in Fig. 11. The arms 32 of the male link are then passed between the edge bar 46 and the center bar 42 of the female link, and at the same time the arms 34 of the male link are passed between the edge bar 44 and the center bar 42 of the female link, the parts then coming into the relationship shown in Fig. 12. The widely open female link is then closed as shown by the change from the broken line position 44', 46' to the solid line position 44, 46 in Fig. 13. At this time the edge bars 44 and 46 have been brought into collateral abutting relation. The arms 32 and 34 of the male link are left open or spaced apart for the addition of a plurality of such assemblies in series. However, the end tabs 56 are bent inward, as shown by the change from the solid line position 56 in Fig. 14 to the broken line position 56'. The movement is of course carried all the way in until the tabs are substantially perpendicular to the cross-bar 42. In other words, they take the position indicated at 56 in Figs. 2, 7, 8, 9 and 13. The end tabs are preferably set in between the end arms of the blank to provide a flush relation, and reverting to Fig. 4 it will be noted that the four corners of the blank are cut away at 59, this forming recesses in which the end of the tab 56 is received. This provides a positive stop for the tabs when they are being pressed inwardly to closed position, the free end of the tab coming outside the ends of the edge bars 44 and 46, as is shown in Fig. 13.

The combining of assemblies is illustrated in Figs. 15 and 16. In Fig. 15 one assembly comprises open male link 60 and closed female link 62. The other assembly comprises open male link 64 and closed female link 66. To combine these assemblies it is merely necessary to close the male link 64 about the edge bars and spacers of the closed female link 62. This is shown in Fig. 16 by the change from the dotted line position 64' to the solid line position 64. It will be understood that additional assemblies may be added in this fashion indefinitely for any desired length of chain.

The action of the spacers will also be clear from study of the drawing, for the spacers on the male links 60 and 64 hold the female links 62 and 66 in overlapping relation relative to the male links, and similarly the spacers on female link 62 hold the male link 64 in overlapping relation. If desired the sub-links of the male links may be brought into end to end contact (see Figs. 1, 2 and 16), and the sub-links of the female links may be brought into end to end contact. This is done by making the spacers of proper dimension. If a slacker or more open mesh chain is desired, it is merely necessary to shorten the spacers so as to permit some clearance between the ends of the simulated links.

As will be seen by reverting to Figs. 3, 4, 6 and 8, in the chain as so far described a side of the female link has an odd number of arms and an even number of spacers, and a side of the male link has an even number of arms and an odd number of spacers, the endmost arms and the tabs being on the female link, and the endmost spacers being on the male link. However, it is not necessary to employ this arrangement, and a modification will be clear from examination of Figs. 17 through 22 of the drawing. Figs. 17, 19 and 20 show a male link, a side of which has an odd number of arms 70 and an even number of spacers 72, while Figs. 18, 21 and 22 show a mating female blank, a side of which has an even number of arms 74 and an odd number of spacers 76. In this modification the endmost arms 78 and the tabs 79 are on the male link, and the endmost spacers 80 are on the female link. In Fig. 17 it should be noted that the endmost arms 78 are incised at the neck of the tab and at the ends of the arms for purposes already explained in connection with the corresponding recesses 58 and 59 in Fig. 4.

Male and female links for still another modification are shown in Figs. 23 through 26 of the drawing. In this case both links have an even number of arms and an even number of spacers. The male link has arms 82 and tab 83 at one end, and spacers 84 at the other end, and the female link similarly has arms 86 and tab 87 at one end, and spacers 88 at the other end, but when the links are put together they are so oriented that the end spacers 84 of the male link come opposite the end arms 86 of the female link, and the end arms 82 of the male link come opposite the end spacers 88 of the female link. The tabs 83 close one edge of the finished chain, while the tabs 87 close the other edge of the finished chain. It will be noted that the tab is located at that end of the link which has arms at the end, so that the tab can close the space between the arms without raising any problem of relative movement of the tab and the arms during flexing of the chain, as would be the case if the tab were located on the end of the link having spacers instead of arms, for the tab of one link would then have to cooperate with the arms of the adjacent link.

As so far described the chain is relatively wide, it having a width corresponding to nine rows of sub-links as shown in Figs. 1 through 22, and eight rows of sub-links as shown in Figs. 23 through 26. For use with a lady's wrist watch, a relatively narrow band may be wanted, and mating male and female blanks for such a chain are shown in Figs. 27 and 28. In this case the male blank has end spacers 90, and the female blank has end arms 92. The end tabs 93 are accordingly provided on the female blank. The usual recesses 94 and 96 are provided for reasons explained in connection with recesses 58 and 59 in Fig. 4. Although no drawing for the same is presented, it will be understood that a modified mating pair of blanks may be provided, in which the male blank has the end arms and tabs, and in which the female blank has end spacers. Except for the marked reduction in the number of rows of sub-links, the construction would be the same as that described before, the blanks last mentioned corresponding to Figs. 17 and 18, while the blanks shown in Figs. 27 and 28 correspond to Figs. 3 and 4, respectively. In all cases the blanks are folded and assembled in pairs, the ends closed, and the pairs combined as has already been described. The precise sequence of the assembly steps is not essential, it being possible to fold the ends before making the pairs or assemblies, or on the other hand, it being possible to fold the end tabs after the assemblies have been put together to make up a complete chain.

It is not necessary for all of the sub-links to have equal width. Some rows may be wider, and some narrower. Mating male and female blanks for a chain of this type are shown in Figs. 29 and 30. The male blank of Fig. 29 has wide spacers 102 at the ends, while the female blank of Fig. 30 has wide arms 104 and tabs 106 at the ends. These blanks correspond respectively to the blanks of Figs. 3 and 4 of the drawing, and are folded up and assembled in exactly the same fashion as was previously described. It will be understood that, although not illustrated, a modified mating pair of blanks may be made, in which the end arms and tabs are provided on the male link, while the end spacers are provided on the female link, the blanks then corresponding to Figs. 17 and 18, respectively, except for the increased width of the end arms and spacers. It will also be understood that the blanks may be made with wide arms and spacers at the center, instead of at the edges.

As so far described the chain is built up of male and female links. This is not essential, however, and the end tabs for closing the ends of the links, and consequently the side edges of the chain, may be used with a basket weave chain built up of male links. Such a chain is illustrated in Figs. 31 through 41 of the drawing. The blank for both the first and second links of each pair of links is shown in Fig. 33. This comprises a center cross-bar 110, having transverse arms 112 and spacers 114 therebetween. There are end arms 116, and a tab 118 at one end, and end spacers 120 at the other end. The end arms 116 are recessed at 122 and 124 for reasons previously explained.

This blank is folded or bent to form the link shown in Figs. 34 and 35. It will be evident that by inverting the link end for end, it will assume the position shown in Figs. 36 and 37, and that the two resulting links may be assembled, because the arms of one come opposite the spacers of the others. The method of assembly will be clear from inspection of Figs. 39, 40 and 41. In these figures the end tabs have been omitted to simplify the drawing. The links are preliminarily in the open position shown in Fig. 39. A second link 126 is added to the first link, and is closed by squeezing the arms together from the broken line position 126' to the solid line position 126 shown in Fig. 41. In this way the links are added successively until a desired length of chain is built up, a short length of such chain being shown in Figs. 31 and 32 of the drawing. It will be evident that with this construction using all male links there is no need to preliminarily assemble the first and second links into pairs. Instead, a second link may be added to a first, then a first link added to the second, and so on. In the particular chain here illustrated the links are all alike, the only difference between a first link and a second link being the inverted position of one relative to the other.

Here again, as was mentioned in connection with Figs. 29 and 30, it is not essential that the rows of sub-links be of equal width. Reference is made to Fig. 42, which shows a blank having a cross-bar with arms, spacers, and an end tab just as was described in connection with Fig. 33, but in the present case the endmost arms 130 are wider than the remaining arms 132, and the endmost spacers 134 are wider than the remaining spacers 136. The arms 130 and spacers 134 correspond in width, and the arms 132 and spacers 136 correspond in width. Therefore, by inverting alternate links a chain may be built up, in which the edge rows of sub-links are wider than the intermediate rows of sub-links. One edge of the chain will be closed by the tabs of alternate links, and the other edge of the chain will be closed by the tabs of the intermediate links.

This arrangement of like links which are alternately inverted may itself be used without end tabs or closures. A blank for this purpose is shown in Fig. 38, and it will be seen that there is a cross-bar 140 with an even number of arms 142, and an even number of spacers 144, one end of the blank terminating in arms, and the other end of the blank terminating in spacers. By inverting alternate blanks the arms will be brought opposite the spacers, and the spacers will be brought opposite the arms, so that the parts can be assembled as shown in Figs. 39, 40 and 41.

A chain may be made having all male links, but in which the first and second links are not alike, one link having arms and tabs at both ends, and the other link having spacers and no tabs at both ends. Blanks for such a chain are shown in Figs. 43 and 44, these blanks being additionally characterized by producing wider sub-links along the edges of the chain than at the center. However, this is not a necessary characteristic, and the arms, and consequently the sub-links, may be made of equal width. In Fig. 43 it will be noted that there are arms at the ends of the link, and consequently the tabs are provided on this link. The mating link shown in Fig. 44 has spacers at the ends of the link, hence there are no tabs on this link. The blanks of Figs. 43 and 44 are folded much as previously described, and the links are added in succession, as was described in connection with Figs. 39, 40 and 41.

Figs. 45 and 46 show a mating pair of blanks for male links which form a chain having a wide row of sub-links along the center, and narrow rows of sub-links at the sides. Since the blank of Fig. 45 has the endmost arms it is also provided with the end tabs for closing the edges of the chain. The mating blank of Fig 46 has spacers at the ends, and therefore has no end tabs. The arms of the second blank come opposite the spacers of the first blank, and correspond thereto in width, and the arms of the first blank come opposite the spacers of the second blank, and correspond thereto in width. These blanks are bent and connected in succession, much as previously described in connection with Figs. 39, 40 and 41.

It is believed that the construction and method of assembly, as well as the advantages of my improved chain construction, will be apparent from the foregoing detailed description. The exposed ends of the links may be closed, thus giving the edges of the chain a closed and solid, rich-looking appearance. One of the several forms of chain assembly shown has the advantage that all links are alike, it being necessary to merely invert alternate links relative to the intermediate links.

It will be understood that chains may be made with an odd number of rows of sub-links, or an even number of rows of sub-links; with a large number of rows of sub-links, or only a few rows of sub-links; with sub-links of equal width, or sub-links of unequal width; with wider sub-links at the center, or at the sides, or in any desired location; with the first and second links male and female links, or with all of the links male links; with the tabs for end closure located both on a single link, or one on one link and the other on the next link, and so on.

It will therefore be apparent that while I have shown and described my invention in a number of specific forms, changes may be made in the structures disclosed, without departing from the spirit of the invention, as sought to be defined in the following claims.

I claim:

1. A basket weave chain made up of first and second links connected in alternation, each link having a cross-bar with arms projecting transversely therefrom in the same general direction, the arms of a first link fitting between the arms of a second link in order to provide a basket weave appearance, and fitting around a cross-bar of a second link in order to pivotally join the links without need for pins, and an end tab at that end of a link having arms at the end, one end of said tab being connected to the said end of said cross-bar and said tab extending in the same general direction as said arms but lying in a plane generally perpendicular to the surface of the chain, said tabs having curved edges so shaped that when folded over in the direction of the arms they serve to close the entire space within the arms, whereby the chain is given closed edges.

2. A basket weave chain made up of first and second links connected in alternation, each link being a folded sheet metal blank having a center cross-bar with arms projecting transversely therefrom, said blanks being bent to form interlocked tubular-like links extending transversely of the chain, the arms of a first link fitting between the arms of a second link in order to provide a basket weave appearance, and fitting around a cross-bar of a second link in order to pivotally join the links without need for pins, and an end tab at that end of a link having arms at the end, one end of said tab being connected to the said end of said cross-bar and said tab extending in the same general direction as said arms but lying in a plane generally perpendicular to the surface of the chain, said tabs having curved edges so shaped that when folded over perpendicular to the cross-bar in the direction of the arms they serve to close the entire space within the arms, whereby the chain is given closed edges.

3. A basket weave chain made up of first and second links connected in alternation, each link having a cross-bar with arms projecting transversely therefrom, and having spacers between said arms, the arms of each first link fitting around the spacers of a second link, and the arms of each second link fitting around the spacers of a first link, in order to provide a relatively close basket weave appearance, and an end tab at that end of a link having arms at the end, there being no tab at that end of a link having spacers at the end, one end of said tabs being connected to the said end of said cross-bar and said tab extending in the same general direction as said arms but lying in a plane generally perpendicular to the surface of the chain, said tabs having curved edges so shaped that when folded over in the direction of the arms they serve to close the entire space within the arms, whereby the chain is given closed edges.

4. A basket weave chain made up of first and second links connected in alternation, each link being a folded sheet metal blank having a center cross-bar with arms projecting transversely therefrom, and having spacers between said arms, said blanks being bent to form tubular-like links extending transversely of the chain, the arms of each first link fitting around the spacers of a second link, and the arms of each second link fitting around the spacers of a first link, in order to provide a relatively close basket weave appearance, and an end tab at that end of a link having arms at the end, there being no tabs at that end of a link having spacers at the end, one end of said tab being connected to the said end of said cross-bar and said tab extending in the same general direction as said arms but lying in a plane generally perpendicular to the surface of the chain, said tabs having curved edges so shaped that when folded over perpendicular to the cross-bar in the direction of the arms they serve to close the entire space within the arms, whereby the chain is given closed edges.

5. A basket weave chain made up of first and second links connected in alternation, each link having a cross-bar with arms projecting transversely therefrom in the same general direction, the arms of a first link fitting between the arms of a second link in order to provide a basket weave appearance, and fitting around a cross-bar of a second link in order to pivotally join the links without need for pins, and an end tab at that end of a link having arms at the end, one end of said tab being connected to the said end of said cross-bar and said tab extending in the same general direction as said arms but lying in a plane generally perpendicular to the surface of the chain, said arms being so notched at their inner and outer ends to a depth approximately equal to the thickness of the metal that the tab is received between and flush with the outer edges of the arms at the top and bottom of the chain, and is disposed outside the arms at the ends of the arms, said tabs being so shaped that when folded over in the direction of the arms they serve to close the entire space within the arms, whereby the chain is given closed edges.

6. A basket weave chain made up of first and second links connected in alternation, each link being a folded sheet metal blank having a center cross-bar with arms projecting transversely therefrom, said blanks being bent to form interlocked tubular-like links extending transversely of the chain, the arms of a first link fitting between the arms of a second link in order to provide a basket weave appearance, and fitting around a cross-bar of a second link in order to pivotally join the links without need for pins, and an end tab at that end of a link having arms at the end, one end of said tab being connected to the said end of said cross-bar and said tab extending in the same general direction as said arms but lying in a plane generally perpendicular to the surface of the chain, said arms being so notched at their inner and outer ends to a depth approximately equal to the thickness of the metal that the tab is received between and flush with the outer edges of the arms at the top and bottom of the chain, and is disposed outside the arms at the ends of the arms, said tabs being so shaped that when folded over perpendicular to the cross-bar in the direction of the arms they serve to close the entire space within the arms, whereby the chain is given closed edges.

7. A basket weave chain made up of first and second links connected in alternation, each link having a cross-bar with arms projecting transversely therefrom, and having spacers between said arms, the arms of each first link fitting around the spacers of a second link, and the arms of each second link fitting around the spacers of a first link, in order to provide a relatively close basket weave appearance, and an end tab at that end of a link having arms at the end, there being no tab at that end of a link having spacers at the end, one end of said tabs being connected to the said end of said cross-bar and said tab extending in the same general direction as said arms but lying in a plane generally perpendicular to the surface of the chain, said arms being so notched at their inner and outer ends to a depth approximately equal to the thickness of the metal that the tab is received between and flush with the outer edges of the arms at the top and bottom of the chain, and is disposed outside the arms at the ends of the arms, said tabs being so shaped that when folded over in the direction of the arms they serve to close the entire space within the arms, whereby the chain is given closed edges.

8. A basket weave chain made up of first and second links connected in alternation, each link being a folded sheet metal blank having a center cross-bar with arms projecting transversely therefrom, and having spacers between said arms, said blanks being bent to form tubular-like links extending transversely of the chain, the arms of each first link fitting around the spacers of a second link, and the arms of each second link fitting around the spacers of a first link, in order to provide a relatively close basket weave appearance, and an end tab at that end of a link having arms at the end, there being no tabs at that end of a link having spacers at the end, one end of said tab being connected to the said end of said cross-bar and said tab extending in the same general direction as said arms but lying in a plane generally perpendicular to the surface of the chain, said arms being so notched at their inner and outer ends to a depth approximately equal to the thickness of the metal that the tab is received between and flush with the outer edges of the arms at the top and bottom of the chain, and is disposed outside the arms at the ends of the arms, said tabs being so shaped that when folded over perpendicular to the cross-bar in the direction of the arms they serve to close the entire space within the arms, whereby the chain is given closed edges.

References Cited in the file of this patent

UNITED STATES PATENTS

| Number | Name | Date |
| --- | --- | --- |
| 1,779,383 | Spatschil | Oct. 21, 1930 |
| 1,795,038 | Prestinari | Mar. 3, 1931 |
| 1,795,039 | Prestinari | Apr. 15, 1931 |
| 1,822,393 | Fassancht et al. | Sept. 8, 1931 |
| 1,962,037 | Schofer | June 5, 1934 |
| 2,528,567 | Williams | Nov. 7, 1950 |
| 2,528,568 | Williams | Nov. 7, 1950 |

FOREIGN PATENTS

| Number | Country | Date |
| --- | --- | --- |
| 440,699 | Great Britain | Jan. 3, 1936 |